US010139707B2

United States Patent
Carlson

(10) Patent No.: US 10,139,707 B2
(45) Date of Patent: Nov. 27, 2018

(54) CAMERA BRACKET

(71) Applicant: TRW AUTOMOTIVE U.S. LLC, Livonia, MI (US)

(72) Inventor: Daniel D. Carlson, Fenton, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 0 days.

(21) Appl. No.: 15/006,355

(22) Filed: Jan. 26, 2016

(65) Prior Publication Data

US 2016/0216595 A1    Jul. 28, 2016

Related U.S. Application Data

(60) Provisional application No. 62/108,740, filed on Jan. 28, 2015.

(51) Int. Cl.
  *G03B 17/56*   (2006.01)
  *G03B 17/02*   (2006.01)

(52) U.S. Cl.
  CPC ........... *G03B 17/561* (2013.01); *G03B 17/02* (2013.01)

(58) Field of Classification Search
  USPC ........................................................ 396/419
  See application file for complete search history.

(56) References Cited

U.S. PATENT DOCUMENTS

| | | | |
|---|---|---|---|
| 6,647,793 B2 | 11/2003 | Dirmeyer et al. | |
| 8,218,205 B2 * | 7/2012 | Nagatani | H04N 1/02815 358/475 |
| 8,235,334 B1 * | 8/2012 | Kobal | F16M 11/041 248/122.1 |
| 8,339,453 B2 | 12/2012 | Blake, III et al. | |
| 8,800,942 B2 * | 8/2014 | Yu | F16M 11/14 248/122.1 |
| 9,297,495 B2 * | 3/2016 | Fischer | F16M 11/041 |
| 2011/0155874 A1 * | 6/2011 | Roehr | B60S 1/0881 248/220.21 |
| 2012/0099850 A1 * | 4/2012 | Onishi | B60R 11/04 396/419 |
| 2012/0175474 A1 * | 7/2012 | Barnard | F16M 11/041 248/122.1 |
| 2013/0134267 A1 * | 5/2013 | Liu | F16M 11/10 248/122.1 |

(Continued)

*Primary Examiner* — Clayton E Laballe
*Assistant Examiner* — Linda B Smith
(74) *Attorney, Agent, or Firm* — Tarolli, Sundheim, Covell & Tummino LLP

(57) ABSTRACT

An apparatus for securing a camera housing (100) having a central axis (102) to a windshield (22) includes a bracket (20). The bracket (20) has a central axis (30) and extends from a first end (32) to a second end (34). A plurality of centering members (72) on the first end (32) of the bracket (20) is configured to engage the camera housing (100) to align the central axis (102) with the central axis (30). A plurality of locking members (90, 91) on the second end (34) of the bracket (20) is configured to form a snap-fit connection with the camera housing (100) to fasten the bracket (20) to the camera housing (100). The locking members (90, 91) are positioned on opposite sides of the central axis (30) of the bracket (20) with at least one locking member (90, 91) extending at an angle less than 90° to the central axis (30).

27 Claims, 8 Drawing Sheets

(56) References Cited

U.S. PATENT DOCUMENTS

| | | | |
|---|---|---|---|
| 2013/0134284 A1* | 5/2013 | Hu | F16M 11/041 248/451 |
| 2015/0309392 A1* | 10/2015 | Wendt | G03B 17/14 396/536 |
| 2016/0023620 A1* | 1/2016 | Matori | B60R 11/04 348/148 |

* cited by examiner

CAMERA BRACKET

RELATED APPLICATIONS

This application claims the benefit of U.S. Provisional Application Ser. No. 62/108,740, filed Jan. 28, 2015, which is incorporated herein by reference in its entirety.

TECHNICAL FIELD

The present invention relates generally to vehicle cameras and, in particular, relates to a bracket for securing a camera to a vehicle windshield.

BACKGROUND

Known camera housing brackets have locking features that all extend perpendicular to the front-to-rear central axis of the bracket. This configuration allows the camera housing to be snapped into the bracket and held in place without first being centered with the bracket.

SUMMARY OF THE INVENTION

In accordance with an example embodiment of the present invention, an apparatus for securing a camera housing having a central front-to-rear axis to a windshield includes a bracket having a central front-to-rear axis. The bracket extends from a first end to a second end. A plurality of centering members on the first end of the bracket is configured to engage the camera housing to align the central axis of the camera housing with the central axis of the bracket. A plurality of locking members on the second end of the bracket is configured to form a snap-fit connection with the camera housing to fasten the bracket to the camera housing. The locking members are positioned on opposite sides of the central axis of the bracket with at least one locking member extending at an angle less than 90° from the central axis.

In accordance with yet another example embodiment of the present invention, a camera mounting assembly includes a bracket mountable to a vehicle windshield and having a central front-to-rear axis. The bracket includes a pair of centering members and a pair of locking members. At least one locking member extends in a direction that is transverse to the central axis. A camera housing has a pair of centering members that cooperate with the centering members of the bracket to center the camera housing within the bracket. A pair of locking members extends from the camera housing and engages the locking members of the bracket to fasten the camera housing to the bracket.

Other objects and advantages and a fuller understanding of the invention will be had from the following detailed description and the accompanying drawings.

DETAILED DESCRIPTION

Figure 1:
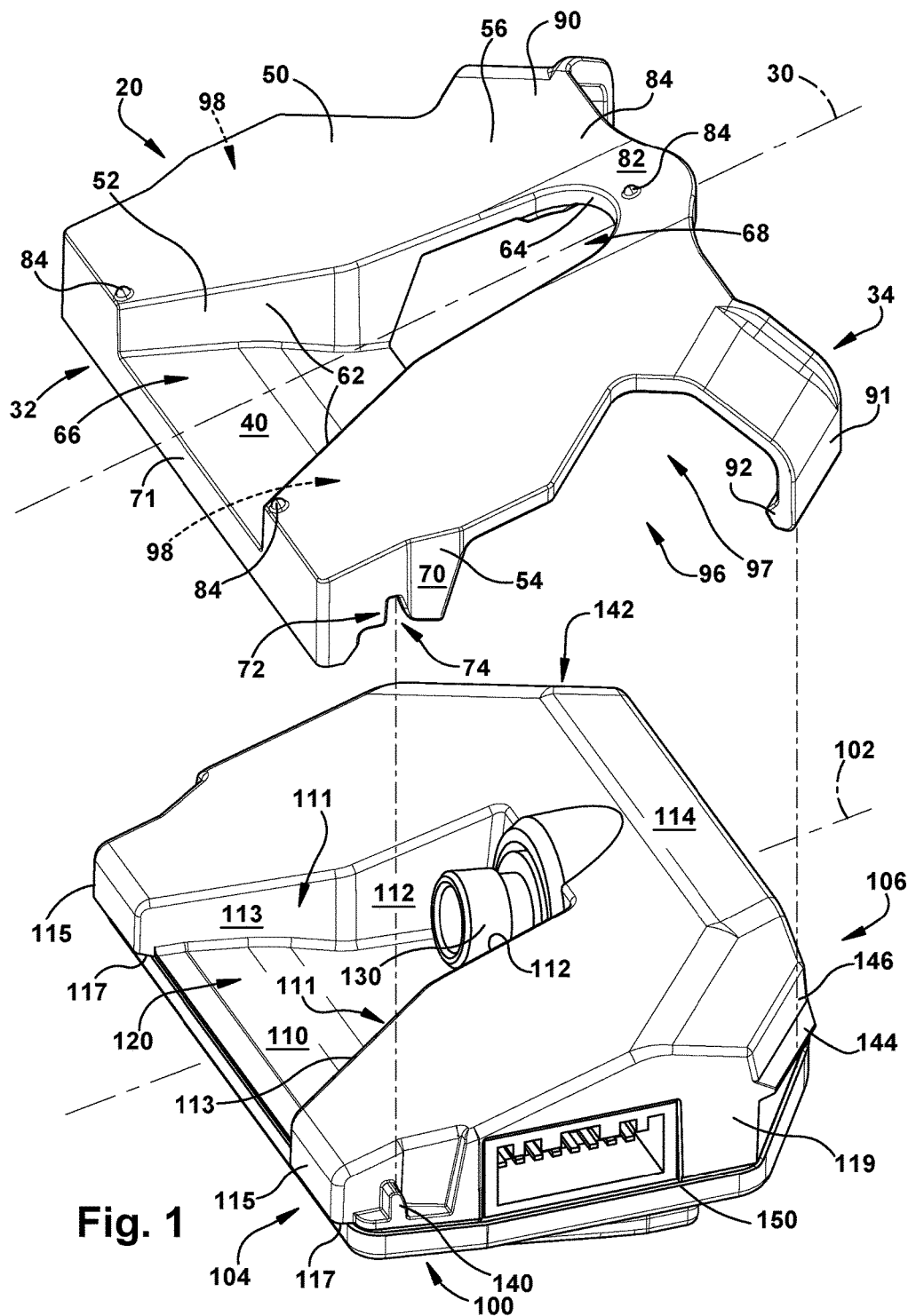
FIG. 1 is an exploded perspective view of a bracket and camera housing for mounting to a vehicle windshield in accordance with an embodiment of the present invention.
Figure 2:
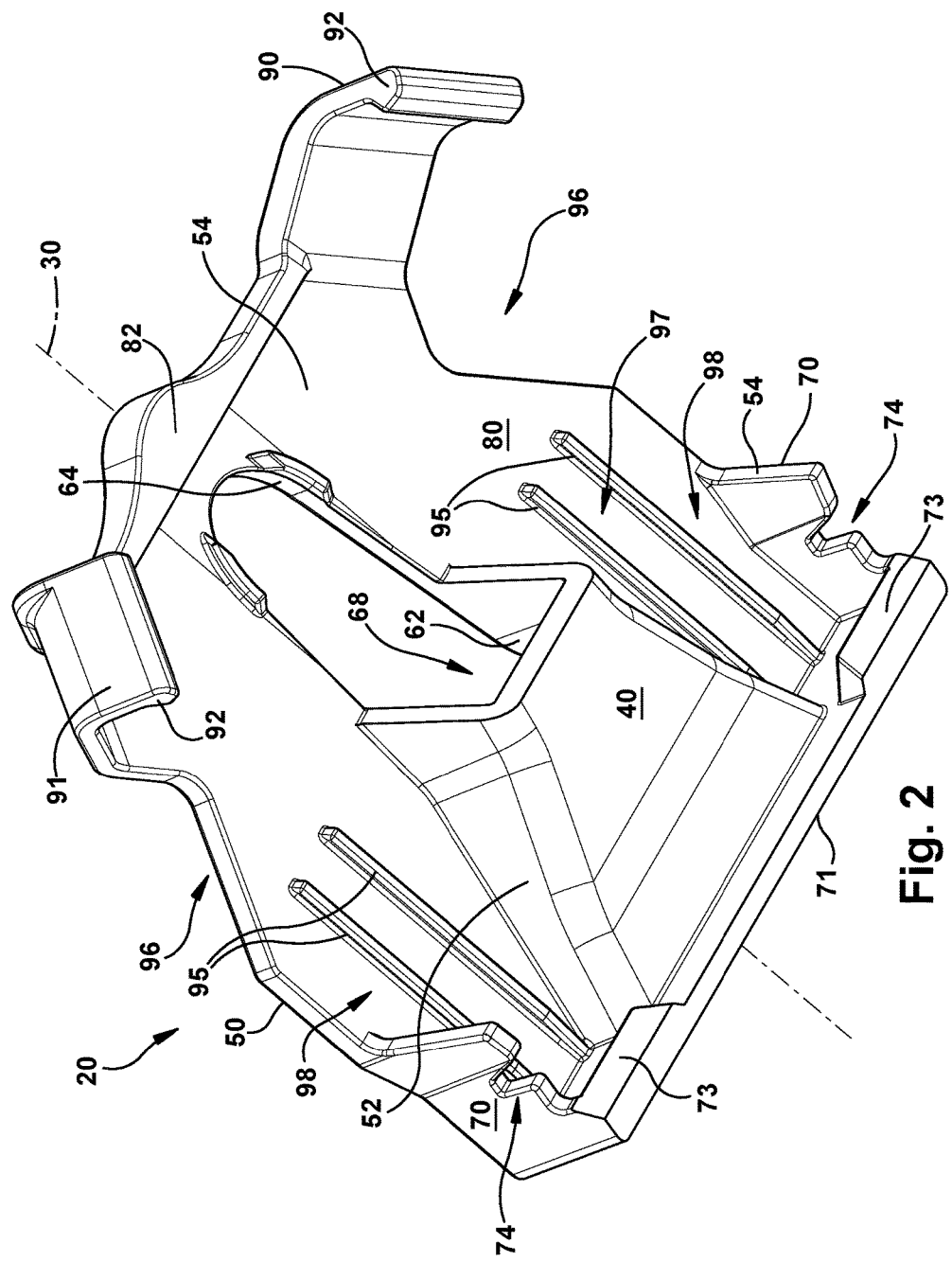
FIG. 2 is a bottom view of the bracket of FIG. 1.
Figure 3:
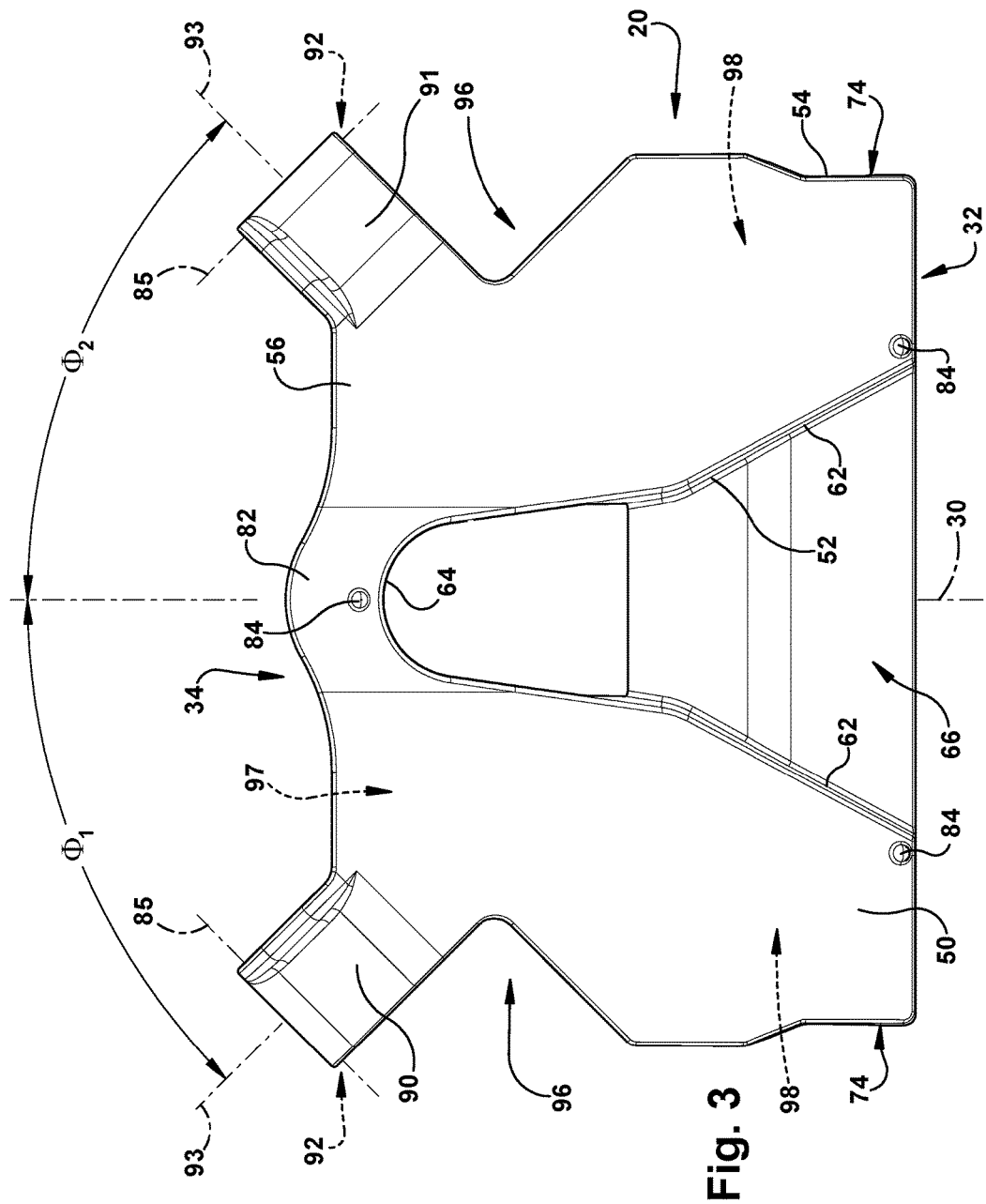
FIG. 3 is a top view of the bracket of FIG. 1.

The present invention relates generally to vehicle cameras and, in particular, relates to a bracket for securing a camera housing to a vehicle windshield. FIGS. 1-3 illustrate a bracket 20 for helping to secure a camera housing 100 to a vehicle windshield in accordance with an embodiment of the present invention.

Referring to FIG. 1, the bracket 20 has a central front-to-rear axis 30 and extends from a first or front end 32 to a second or rear end 34. The bracket 20 includes a base 40 and a cover 50 connected to the base. The cover 50 includes an inner portion 52, an outer portion 54, and an upper portion 56 that extends between the inner and outer portions.

The inner portion 52 extends upward from the base 40 to the upper portion 56. The inner portion 52 includes a pair of first surfaces 62 and a second surface 64. The first surfaces 62 are symmetrically positioned on opposite sides of the central axis 30. The first surfaces 62 extend away from one another in a direction extending towards the first end 32. The first surfaces 62 can alternatively extend substantially parallel to each other (not shown). The second surface 64 is U-shaped and interconnects the first surfaces 62. The legs of the second surface 64 extend on opposite sides of the central axis 30.

An opening 68 extends through the bracket 20 adjacent the second surface 64. The inner portion 52 and base 40 cooperate to define a passage 66 extending along the central axis 30 from the first end 32 towards the second end 34. The passage 66 extends to the opening 68.

The upper portion 56 includes a U-shaped upper surface 82. The legs of the upper surface 82 extend from the first end 32 to the second end 34 on opposite sides of the central axis 30. Projections 84 extend upwards from the upper surface 82. The projections 84 are configured to engage an inner surface of a windshield.

The outer portion 54 extends downward from the upper portion 56. The outer portion 54 includes a pair of lateral surfaces 70 positioned on opposite sides of the central axis 30. A front surface 71 of the outer portion 54 interconnects the lateral surfaces 70 at the first end 32.

Referring further to FIG. 2, a pair of centering members 72 is provided on the first end 32 of the bracket 20 for helping to secure the camera housing 100 to the bracket 20 while centering the camera housing on the bracket. As shown, each centering member 72 includes an opening or notch 74 extending entirely through the outer portion 54 adjacent the lateral surfaces 70. The notches 74 can alternatively be blind openings in the outer portion 54 (not shown). In one example, the notches 74 have a triangular/trapezoidal cross-section, although other shapes are contemplated, e.g., hook-shaped. The notches 74 are symmetrically positioned on opposite sides of the central axis 30.

A pair of resilient locking members 90, 91 extends from the upper portion 56 at the second end 34 of the bracket 20. As shown, the locking members 90, 91 extend downward from the upper portion 56 on opposite sides of the central axis 30. Each locking member 90, 91 has an L-shaped configuration and terminates at a rounded tab 92. The tabs 92 have a larger cross-section than the adjacent portion of the respective locking member 90, 91. The tabs 92 extend inwardly from the locking members 90, 91.

As viewed in FIG. 3, each locking member 90, 91 extends generally along a longitudinal axis 93 from the upper portion 56. The longitudinal axes 93 extend at an angle relative to the central axis 30 that is less than 90°. The locking member 90 extends along the longitudinal axis 93 from the upper portion 56 at a first angle $\Phi_1$ relative to the central axis 30. The locking member 91 extends along the longitudinal axis 93 at a second angle $\Phi_2$ relative to the central axis 30. The first and second angles $\Phi_1$, $\Phi_2$ can be the same or different from one another, but the longitudinal axes 93 always extend transverse to the central axis 30. In one example, the first and second angles $\Phi_1$, $\Phi_2$ are both about 45° such that the longitudinal axes 93 are perpendicular to one another. It is contemplated that only one longitudinal axis 93 may extend at an angle to the central axis 30 that is less than 90°.

The tabs 92 have a length extending along an axis 85. The axis 85 and lengths of the tabs 92 extend generally perpendicular to the longitudinal axes 93. Therefore, the lengths of the tabs 92 are angled, e.g., transverse, relative to the central axis 30 (as viewed in FIG. 3). The axes 85 and lengths of the tabs 92 extend at an obtuse angle to the central axis 30.

Referring to FIGS. 1-2, the base 40, cover 50, and locking members 90, 91 cooperate to define an interior 97 of the bracket 20. The inner portion 52 divides the interior 97 into a pair of spaces 98 configured to receive portions of the camera housing 100. As shown, a pair of generally trapezoidal receiving spaces 98 is defined on opposite sides of the central axis 30. Either or both of the receiving spaces 98 can have a different shape than the shape shown, depending on the portions of the camera housing 100 to be received. Furthermore, the receiving spaces 98 can have the same shape or different shapes from one another. A pair of lateral openings 96 (FIG. 3) extends between the locking members 90, 91 and the outer portion 54 into the interior 97.

A series of longitudinal ribs 95 is provided within the interior space 97 on an inner surface 80 of the upper portion 54. The ribs 95 are configured to engage the top of the camera housing 100. The ribs 95 are positioned on opposite sides of the inner portion 52.

Referring to FIG. 2, one or more tabs or projections 73 extend from the outer portion 54 opposite the front surface 71 towards the interior 97. As shown, a pair of projections 73 is positioned on opposite sides of the central axis 30 and extends into the receiving spaces 98. The projections 73 can have a trapezoidal shape (as shown) or another shape (not shown).

Figure 4:
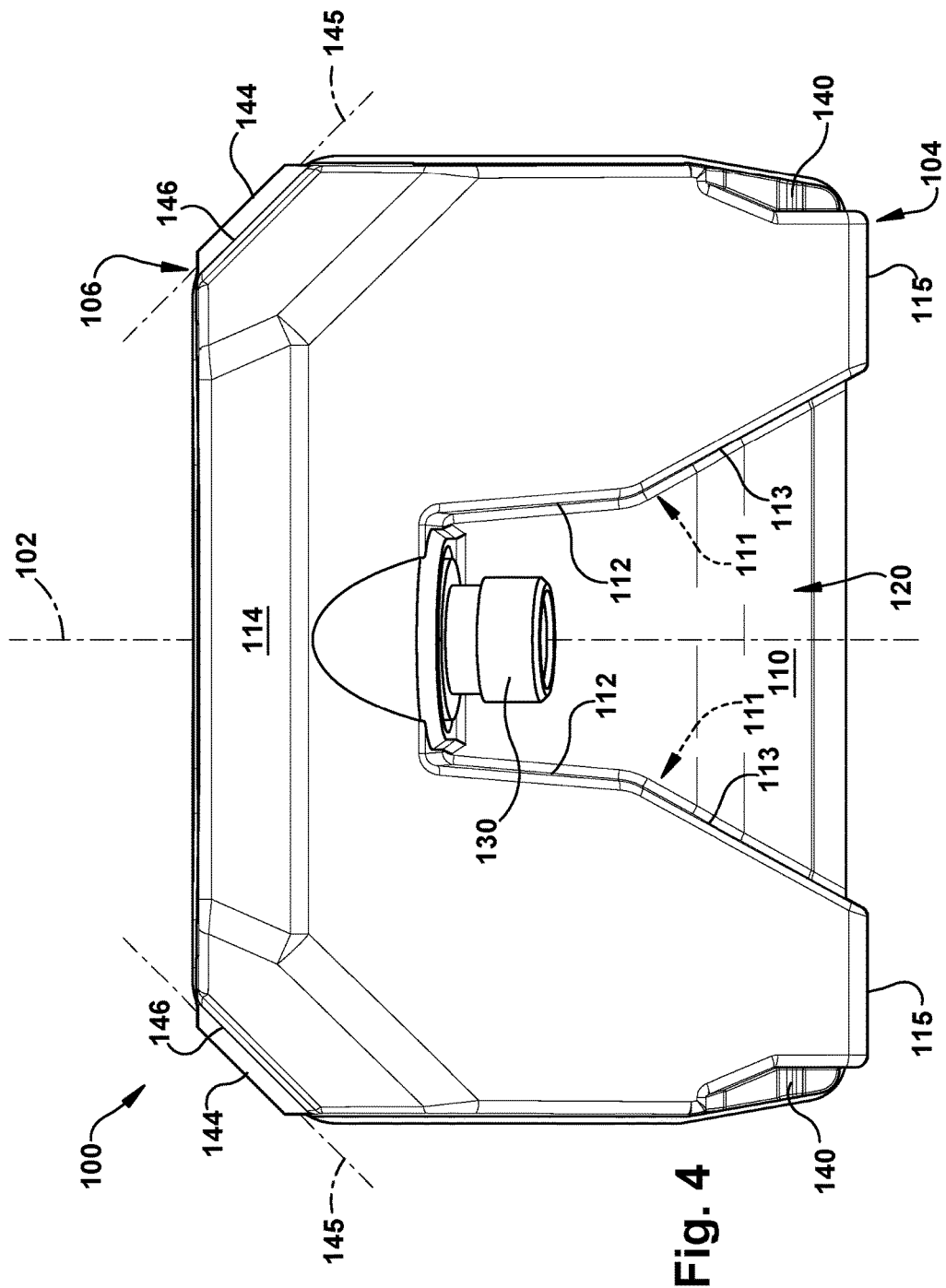
FIG. 4 is a top view of the camera housing of FIG. 1.

FIGS. 1 and 4 illustrate a camera housing 100 for use with the bracket 20 of the present invention. The camera housing 100 has a central front-to-rear axis 102 and extends from a first or front end 104 to a second or rear end 106. The camera housing 100 includes a base 110, an upper surface 114, and a pair of inner surfaces 111 extending from the base to the upper surface. The inner surfaces 111 are positioned on opposite sides of the central axis 102.

Each inner surface 111 includes a first portion 112 and a second portion 113. The first portions 112 extend substantially parallel to one other. The second portions 113 extend from the first portions 112 towards the first end 104 at an angle relative to one another. As shown, the second portions 113 extend away from one another in a direction extending towards the first end 104 of the camera housing 100. The first portions 112 and second portions 113 can be symmetrically (as shown) or asymmetrically arranged (not shown) about the central axis 102.

The upper surface 114 is U-shaped with the legs of the upper surface extending from the second end 106 to the first end 104 on opposite sides of the central axis 102. A pair of lateral surfaces 119 extend downward from the upper surface 114. The lateral surfaces 119 are located on opposite sides of the central axis 102.

The inner surfaces 111 and base 110 cooperate to define a passage 120 having a similar or identical shape to the shape of the passage 66 in the bracket 20. A camera lens 130 of a camera extends into the passage 120. The field of view of the lens 130 is not obstructed by the interior walls 111 or the base 110.

The first end 104 of the camera housing 100 includes a pair of projections 115 on opposite sides of the central axis 102. Each projection 115 includes a surface 117 facing away from the upper surface 114, e.g., downward as viewed in FIG. 1. The projections 115 are configured to releasably engage the projections 73 on the bracket 20.

A centering member 140 extends from each lateral surface 119 at the first end 104 of the camera housing 100. The centering members 140 are configured to cooperate with the centering members 72 on the bracket 20. As shown, two centering members 140 are positioned on opposite sides of the central axis 102 in a symmetric manner. Each centering member 140 constitutes a projection having a shape that mirrors the shape of the corresponding notch 74 on the bracket 20, e.g., triangular, trapezoidal, hook-shaped, etc. It will be appreciated that only one centering member 140 could be provided on the first end 104 (not shown).

The centering members 72, 140 are configured to releasably engage one another when the bracket 20 is connected to the camera housing 100. The connection helps ensure the bracket 20 is properly oriented and aligned when secured to the camera housing 100. More specifically, the centering members 140 are configured to engage the centering members 72 to pull the camera 130 forward into a stable, predetermined position for dependable camera locating.

A pair of locking members 144 is provided on the second end 106 of the camera housing 100 for engaging the locking members 90, 91 on the bracket 20. The locking members 144 are provided on rear surfaces 146 of the camera housing 100. The locking members 144 are symmetrically positioned on opposite sides of the central axis 102. Each rear surface 146 extends downward from the upper surface 114 and along the second end 106 of the camera housing 100. The rear surfaces 146 are shaped and positioned relative to the central axis 102 in a manner that mimics the shape and position of the locking members 90, 91 on the bracket 20 relative to the central axis 30. It will be appreciated that one of the locking members 144 can be located at a different location on the camera housing 100, e.g., along the lateral surface 119.

Each locking member 144 constitutes a projection extending outwardly from the respective rear surface 146. As shown, the projections 144 are triangular/trapezoidal, although other shapes may be used. As viewed in FIG. 4, at least one of the projections 144 has a length extending along an axis 145 that extends transverse to the central axis 102.

The camera housing 100 further includes a connector 150 for transmitting data and/or electrical signals to an external device (not shown). The connector 150 is positioned adjacent one of the lateral surfaces 119. The connector 150 extends generally toward the central axis 102.

Figure 5A:
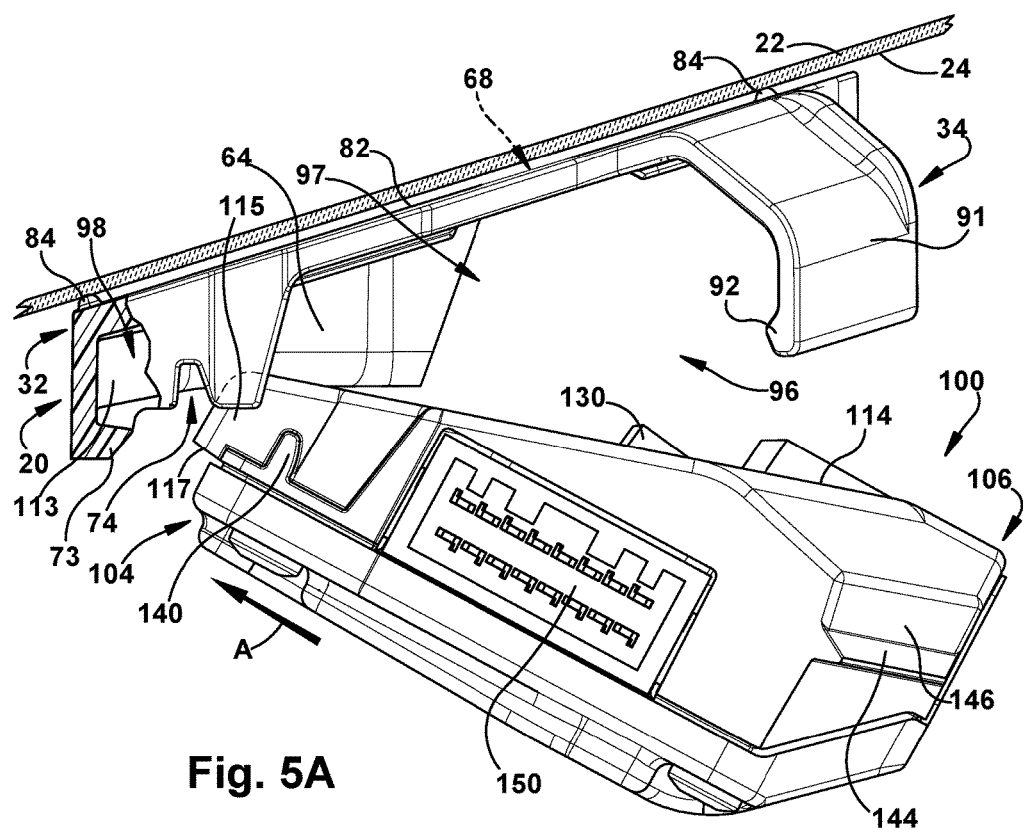
FIGS. 5A-5C are side elevation views of the bracket and camera housing of FIG. 1 during various steps of mounting the camera housing to a vehicle windshield.
Figure 5B:
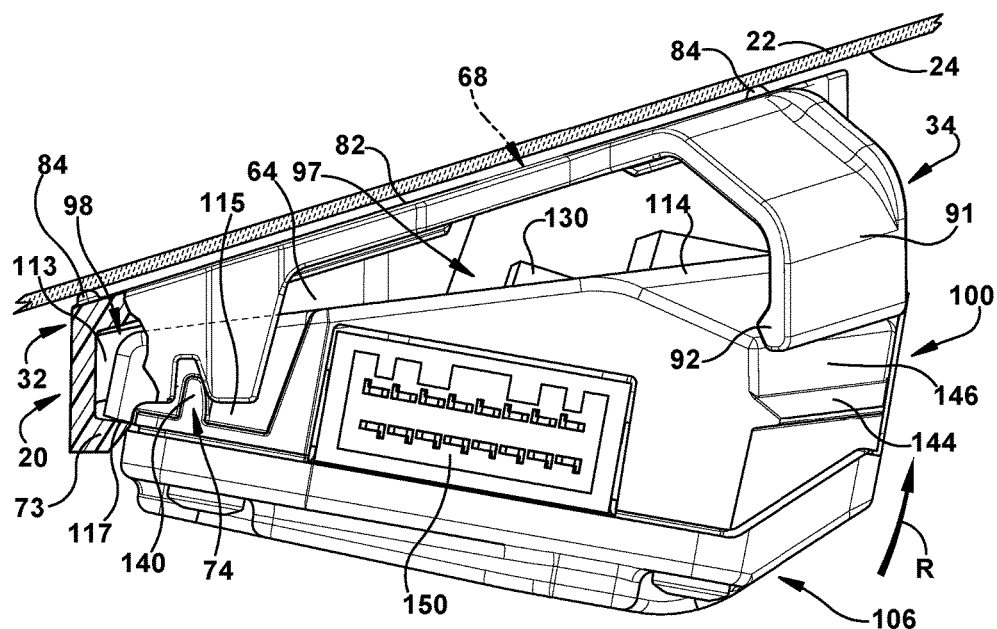
Figure 5C:
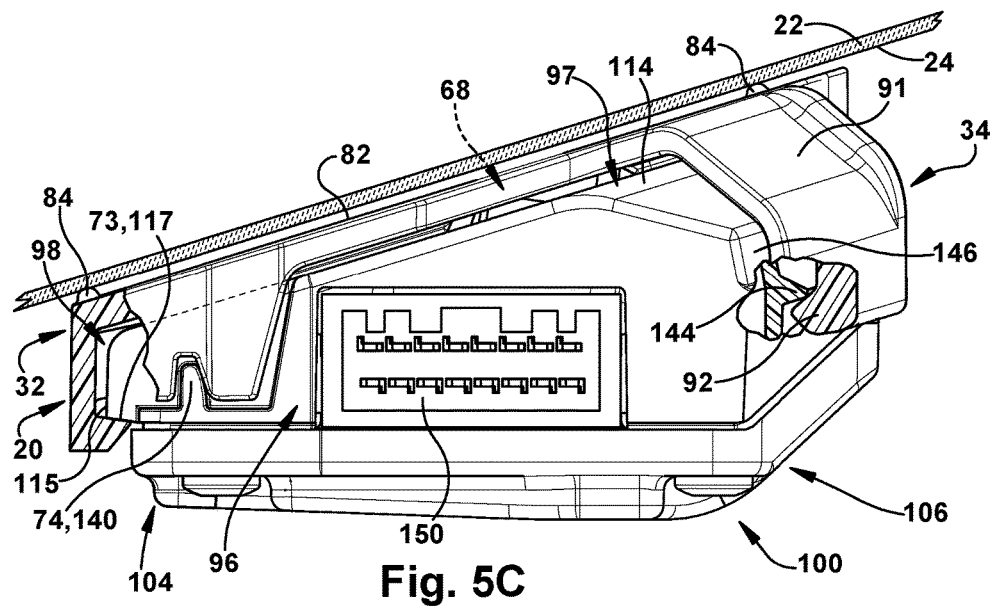

FIGS. 5A-5C illustrate steps for connecting the camera housing 100 to the bracket 20 when the bracket is already secured to a vehicle windshield 22. Referring to FIG. 5A, the bracket 20 is securely fastened to an inner surface 24 of the windshield 22 via adhesive or the like. The bracket 20 is oriented such that the projections 84 abut the inner surface 24 of the windshield 22. In this condition, the first end 32 of the bracket 20 is positioned below the second end 34 of the bracket, i.e., the bracket is angled downwards along the windshield 22.

The camera housing 100 is oriented such that the first end 104 is in proximity with the first end 32 of the bracket 20. The second end 106 of the camera housing 100 is in proximity with the second end 34 of the bracket. The first end 104 is tilted upwards relative to the second end 106 (FIG. 5A).

The camera housing 100 is then moved upwards in the manner indicated generally by the arrow A in FIG. 5A to the position shown in FIG. 5B. In this position, the surfaces 117 on the camera housing 100 extend into the receiving spaces 98 and abut the projections 73 on the bracket 20. As this occurs, the centering members 140 on the camera housing 100 connect with the centering members 72 on the bracket 20. As shown, the projections 140 on the camera housing 100 move into the notches 74 on the bracket 20.

This movement automatically repositions/orients the camera housing 100 within the bracket 20. More specifically, the centering members 72, 140 cooperate to rotate, tilt, and/or axially shift the camera housing 100 until the central axes 30, 102 are positioned/aligned in a common vertical plane (not shown), which allows the centering members 72, 140 to connect with one another. Once the camera housing 100 is oriented to the position shown in FIG. 5B a pivotable connection exists between the camera housing and the stationary bracket 20 about the engaged projections 73, 115.

The camera housing 100 is then pivoted upwards in the direction indicated by the arrow R in FIG. 5B to the position shown in FIG. 5C. The second end 106 of the camera housing 100 is brought into abutment with the locking members 90, 91 of the bracket 20. In particular, the upper surface 114 is pivoted into engagement with the tabs 92 of the locking members 90, 91. Further pivoting in the direction R causes the rear surfaces 146 to engage the locking members 90, 91. Owing to the resilient construction of the locking members 90, 91, the tabs 92 on the bracket 20 deflect outward as the second end 106 of the camera housing 100 moves closer to the windshield 22.

Further pivoting in the direction R causes the tabs 92 to deflect further outward and pass over the projections 144, ultimately forming a snap-fit connection therewith (FIG. 5C). The resilient locking members 90, 91 securely hold the projections 144 on the camera housing 100 and apply a biasing force urging the camera housing towards the bracket 20. The biasing force is sufficient to prevent the camera housing 100 from disconnecting from the bracket 20 due to, for example, the weight of the camera housing and vibration. Consequently, the cooperating projections 73, 115 and locking members 90, 91, 144 hold the camera housing 100 in the bracket 20 in an aligned, secure manner.

Figure 6:
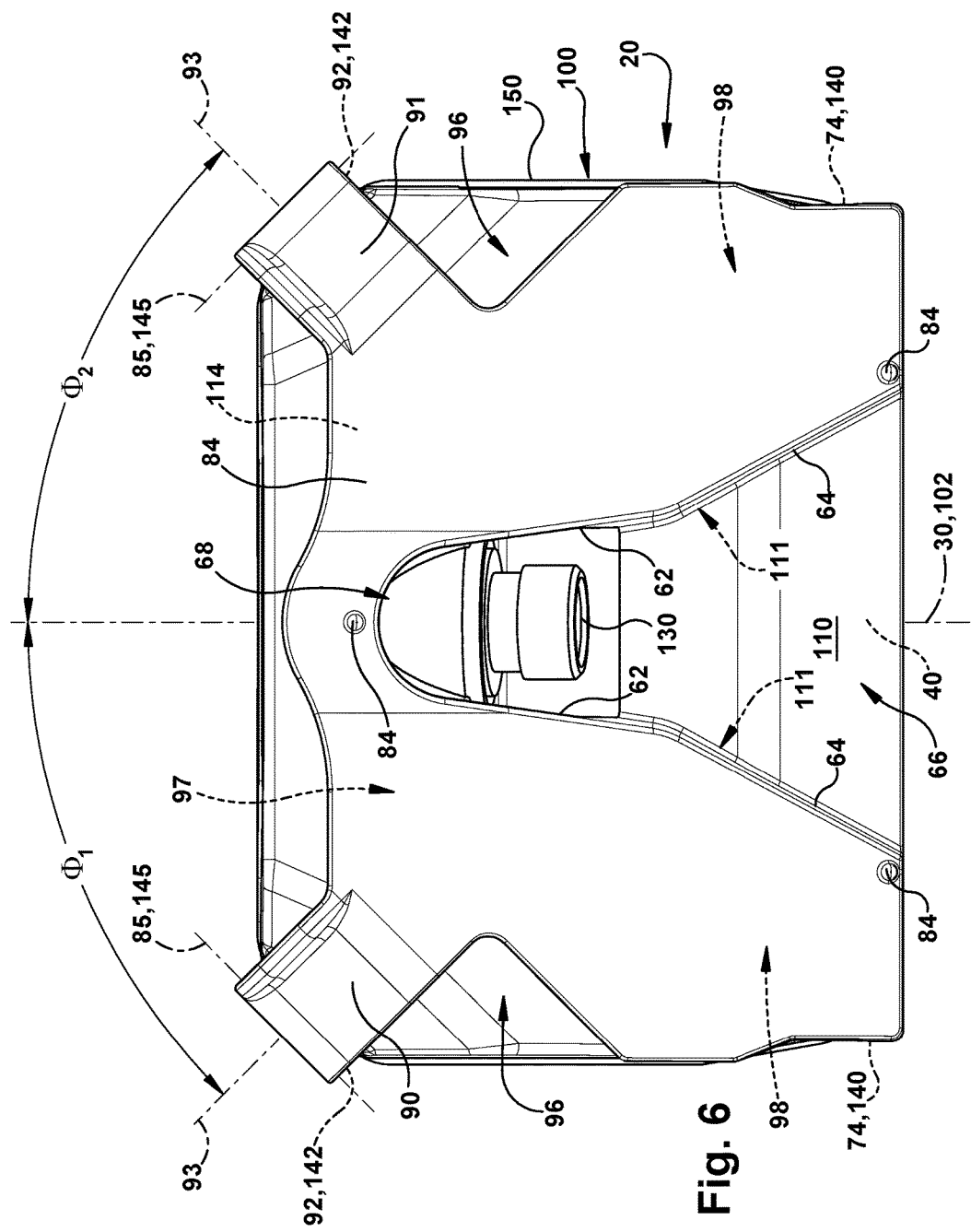
FIG. 6 is a top view of FIG. 5C with the windshield omitted.

Referring to FIG. 6, when the camera housing 100 is snapped into the bracket 20 (FIG. 6), the inner surfaces 111 of the camera housing are positioned within the receiving spaces 98. The upper surface 114 of the camera housing 100 is positioned within the interior 97 of the bracket 20. The bases 40, 110 overlay one another and the connector 150 is aligned with and exposed through one of the lateral openings 96 in the bracket 20.

The camera lens 130 extends through the opening 68 in the bracket 20 such that the field of view of the lens is unobstructed through the passage 66 in the bracket. To this end, the bracket 20 securely mounts the camera housing 100 in a manner that places the lens 130 field of view in a predetermined position and orientation relative to the windshield 22.

The bracket 20 of the present invention advantageously helps prevent improper installation of the camera housing 100. As noted, at least one of the locking members 90, 91 extends at a non-perpendicular angle $\Phi_1$ or $\Phi_2$ relative to the central axis 30 of the bracket 20. Consequently, the non-orthogonal locking member(s) 90, 91 acts as an axial stop for the camera housing 100. The first end 32 of the bracket 20 acts as the other axial stop. This configuration prevents the camera housing 100 from being snapped into the locking members 90, 91 at multiple axial positions relative to the windshield. In other words, the camera housing 100 cannot be snapped into the locking members 90, 91 at different positions along its length.

Furthermore, the bracket 20 is configured such that the locking members 90, 91 are prevented from snapping onto the projections 144 unless the projections 73, 115 are first engaged and the centering members 72, 140 engaged. To this end, the projections 73, 115 and centering members 72, 140 are configured to locate the camera housing 100 in both the front-to-rear direction and laterally relative to the bracket 20 in a predetermined position. As a result, the camera housing 100 in FIG. 5B is oriented in the only manner that will allow the locking members 90, 91 to snap onto the projections 144.

The projections 144 move along an arc towards the locking members 90, 91 as the camera housing 100 pivots in the direction R. The arc must be centered at the pivotable connection at the projections 73, 115 to allow the locking members 90, 91 to snap onto the projections 144. In other words, the locking members 90, 91 will not securely snap onto the projections 144 unless the projections move along this arc centered at the pivotable connection.

That being said, unless the centering members 72, 140 are properly engaged and the projections 73, 115 properly engaged, the tabs 92 will not align with the rear surfaces 146 and will not form a snap-fit connection with the projections 144. The camera housing 100 can therefore be secured to the bracket 20 in only one manner and orientation. Consequently, the inability to snap the camera housing 100 into the bracket 20 will quickly notify the user that the camera housing must first be re-oriented and centered in the bracket before being pivoted in the direction R into snapped engagement with the locking members 90, 91.

Figure 7:
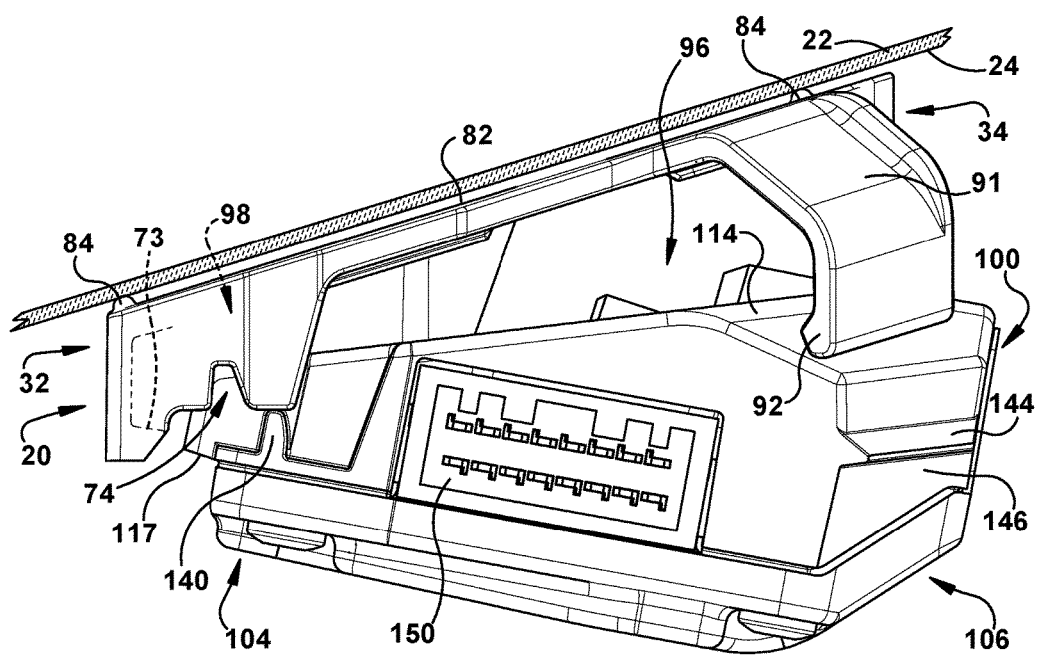
FIG. 7 is a side elevation view illustrating improper installation of the bracket and camera housing of FIG. 1.

FIG. 7 illustrates an example of improper installation of the camera housing 100 into the bracket 20. In FIG. 7, the camera housing 100 is shifted axially in the direction B towards the rear of the vehicle. The centering members 140 are positioned rearward of the centering members 74. The surfaces 117 are positioned rearward of the projections 73. Consequently, the projections 144 are shifted too far in the rearward direction from the centering members 74. The locking members 90, 91 are therefore misaligned with the rear surfaces 146 and, thus, the locking members are prevented from forming the snap-fit connection with the projections 144. Consequently, the camera housing 100 cannot be secured to the bracket 20 unless the camera housing is properly oriented and centered in the manner described.

What have been described above are examples of the present invention. One of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus for securing a camera housing having a central front-to-rear axis to a windshield comprising:

a bracket having a central front-to-rear axis and extending from a first end to a second end, a plurality of centering members on the first end of the bracket being configured to engage the camera housing to align the central axis of the camera housing with the central axis of the bracket, at least one of the plurality of centering members and at least one other of the plurality of centering members being arranged on opposite sides of the central front-to-rear axis of the bracket, a plurality of locking members on the second end of the bracket being configured to form a snap-fit connection with the camera housing to fasten the bracket to the camera housing, the locking members being positioned on opposite sides of the central axis of the bracket with at least one locking member extending at an angle less than 90° to the central axis of the bracket.

2. The apparatus recited in claim 1, wherein both locking members extend at an angle less than 90° to the central axis of the bracket.

3. The apparatus recited in claim 1, wherein the locking members extend substantially perpendicular to one another.

4. The apparatus recited in claim 1, wherein each locking member is angled 45° or less from the central axis of the bracket.

5. The apparatus recited in claim 1, wherein the locking members of the bracket do not form a snap-fit connection with the camera housing unless the centering members are engaged with the camera housing.

6. The apparatus recited in claim 1, wherein each locking member on the bracket has an L-shaped configuration formed from a resilient material.

7. The apparatus recited in claim 1, wherein each locking member includes a tab configured to form a snap-fit connection with a corresponding projection on the camera housing.

8. The apparatus recited in claim 1, wherein the centering members on the bracket comprise a plurality of hook-shaped notches.

9. The assembly recited in claim 1, wherein the centering members are configured to engage the camera housing such that the camera housing can pivot about the centering members into the snap-fit connection with the locking members.

10. The assembly recited in claim 1, wherein the locking members are integrally formed with the bracket.

11. The assembly recited in claim 1, wherein each of the plurality of locking members is formed as one piece with the bracket.

12. The assembly recited in claim 1, wherein each of the plurality of centering members is formed as one piece with the bracket.

13. The assembly recited in claim 1, wherein at least one of the plurality of locking members and at least one other of the plurality of locking members are arranged on opposite sides of the central front-to rear axis of the bracket.

14. The apparatus recited in claim 7, wherein the tab has a length extending in a direction that is transverse to the central axis.

15. A camera mounting assembly comprising:
a bracket mountable to a vehicle windshield and having a central front-to-rear axis, the bracket including a pair of centering members and a pair of locking members, at least one locking member extending in a direction that is transverse to the central axis; and
a camera housing having a pair of centering members that cooperate with the centering members of the bracket to center the camera housing within the bracket, a pair of locking members extending from the camera housing and being pivotable with the camera housing about the cooperating centering members until the locking members of the camera housing engage the locking members of the bracket to fasten the camera housing to the bracket.

16. The assembly recited in claim 15, wherein both locking members on the bracket extend in a direction that is transverse to the central axis.

17. The assembly recited in claim 15, wherein the locking members on the bracket extend substantially perpendicular to one another.

18. The assembly recited in claim 15, wherein each locking member on the bracket is angled 45° or less from the central axis of the bracket.

19. The assembly recited in claim 15, wherein each locking member on the bracket has an L-shaped configuration formed from a resilient material.

20. The assembly recited in claim 15, wherein each locking member on the bracket includes a tab configured to form a snap-fit connection with a corresponding projection on the camera housing.

21. The assembly recited in claim 15, wherein the centering members on the bracket comprise a plurality of hook-shaped notches arranged on opposite sides of the central axis of the bracket.

22. The assembly recited in claim 15, wherein the at least one locking member is integrally formed with the bracket.

23. The assembly recited in claim 15, wherein the central front-to-rear axis of the bracket extends at least one of substantially parallel and coincident with a central front-to-rear axis of a vehicle when the bracket is mounted to the vehicle windshield.

24. The assembly recited in claim 16, wherein both locking members on the camera housing extend in a direction that is transverse to a central front-to-rear axis of the camera housing.

25. The assembly recited in claim 20, wherein the locking members on the bracket do not form a snap-fit connection with the camera housing unless the centering members on the bracket are engaged with the camera housing.

26. The assembly recited in claim 20, wherein the tab has a length extending in a direction that is transverse to the central axis.

27. The assembly recited in claim 20, wherein the projection is triangular.

* * * * *